(12) United States Patent
Wehrs, III

(10) Patent No.: US 9,937,413 B1
(45) Date of Patent: Apr. 10, 2018

(54) TILE TRAY

(71) Applicant: Compound Fun LLC, Redmond, WA (US)

(72) Inventor: Raymond F. Wehrs, III, Sammamish, WA (US)

(73) Assignee: Compound Fun LLC, Redmond, WA (US)

( * ) Notice: Subject to any disclaimer, the term of this patent is extended or adjusted under 35 U.S.C. 154(b) by 0 days.

(21) Appl. No.: 15/287,353

(22) Filed: Oct. 6, 2016

(51) Int. Cl.
| | | |
|---|---|---|
| A63F 11/00 | (2006.01) | |
| A63F 1/06 | (2006.01) | |
| A63F 3/04 | (2006.01) | |
| A63F 3/00 | (2006.01) | |
| A63F 9/00 | (2006.01) | |
| A63F 9/08 | (2006.01) | |

(52) U.S. Cl.
CPC .............. *A63F 11/00* (2013.01); *A63F 1/067* (2013.01); *A63F 3/00634* (2013.01); *A63F 3/0423* (2013.01); *A63F 9/0098* (2013.01); *A63F 9/0807* (2013.01); *A63F 2003/00324* (2013.01); *A63F 2003/0426* (2013.01); *A63F 2003/0428* (2013.01)

(58) Field of Classification Search
CPC ............ A63F 3/0423; A63F 2003/0426; A63F 2003/0428; A63F 2003/00324; A63F 3/00634; A63F 9/0098; A63F 9/0807
USPC ......... 273/281, 282.1, 282.3, 284, 291, 309, 273/272
See application file for complete search history.

(56) References Cited

U.S. PATENT DOCUMENTS

| | | | | |
|---|---|---|---|---|
| 3,610,627 A | * | 10/1971 | Peebles ................. | A63F 3/0023 273/282.1 |
| 4,512,584 A | * | 4/1985 | Propsom ............. | A63F 3/00574 273/282.1 |
| 5,230,518 A | * | 7/1993 | Crowe .................. | A63F 3/0423 273/299 |
| 5,344,153 A | * | 9/1994 | Watanabe ........... | A63F 3/00176 273/261 |
| 2008/0174069 A1 | * | 7/2008 | Ouellet ............... | A63F 3/00574 273/272 |

FOREIGN PATENT DOCUMENTS

| | | | | |
|---|---|---|---|---|
| GB | 0787287 | | * 12/1957 | |
| GB | 2159422 A | | * 12/1985 | ......... A63F 3/00574 |

OTHER PUBLICATIONS

Image of packaging for "High Five!" board game, 2010.

* cited by examiner

*Primary Examiner* — Benjamin Layno
(74) *Attorney, Agent, or Firm* — Bingham Greenebaum Doll LLP; Brian W. Chellgren

(57) ABSTRACT

This disclosure relates to a tile tray configured to facilitate manipulation of tiles. More specifically, the disclosed tile tray includes at least one cell including a bottom, at least one side abutting the bottom and extending upward therefrom, a node extending upward from the bottom and having a flat top surface, and a channel between the node and the at least one side. A tile positioned atop the top surface of the node may be manipulated by pressing a portion of the tile into the channel, thereby raising the opposite portion of the tile, the node serving as a fulcrum. The portion pressed into the channel may be moved along the channel, thereby rotating the tile, or the raised opposite portion may be grasped by a user to flip or move the tile.

15 Claims, 14 Drawing Sheets

TILE TRAY

FIELD OF THE INVENTION

This disclosure relates to a tile tray configured to facilitate manipulation of tiles. More specifically, the disclosed tile tray includes at least one cell including a bottom, at least one side abutting the bottom and extending upward therefrom, a node extending upward from the bottom and having a flat top surface, and a channel between the node and the at least one side. A tile positioned atop the top surface may be manipulated by pressing a portion of the tile into the channel, thereby raising the opposite portion of the tile, the node serving as a fulcrum. The portion pressed into the channel may be moved along the channel, thereby rotating the tile, or the raised opposite portion may be grasped by a user to flip or move the tile.

BACKGROUND OF THE INVENTION

Traditional tile tray systems are designed for organizing, displaying, and storing tiles. Such tiles may be counters used in tabletop games, puzzle pieces, or components of educational teaching tools or professional training tools utilizing physical manipulation and arrangement of subcomponents displayed on tiles to create larger designs. For example, individual tiles representing furniture pieces can be arranged on a tile tray representing a room to aid interior design planning. For another example, individual tiles representing atoms and chemical bonds can be arranged on a tile tray to represent molecules. For a further example, individual tiles may display segments of a path, and multiple tiles may be arranged in sequence to create a path extending across the tile tray as part of a game. Tile based systems may be applied to engineering schematics, aerospace, chemistry, medicine, games, computer coding, blue prints, architecture, interior design, fashion, and many other complex areas using physical manipulation and organization of thought patterns (e.g., flow charts), precision drawings, project elements, and visuals. Manipulation of tiles (e.g., adding, removing, moving, rotating or flipping) can be tailored to incorporate the needs of these fields by setting up a dynamic tile system that can rapidly assess several potential possibilities simultaneously, and allow many possible patterns to be created using only a few tiles.

Traditional tile tray systems commonly face two challenges. First, flat tiles placed on a flat tray may be difficult to grasp and lift from the tray. Second, manipulating a tile may result in the manipulated tile contacting an adjacent tile or another tile in proximity to the manipulated tile, moving the other tile and disrupting the arrangement of tiles on the tile tray. It was realized by the inventor that improvements in tile trays are needed to address these challenges and provide other important advantages.

SUMMARY

The disclosed tile tray addresses these challenges and provides multiple benefits to a user. The disclosed tile tray may be used as a component of an expandable, modular tile tray system wherein multiple individual tile trays may be connected to create a larger tile tray and later disconnected for ease of use, storage or transport. The disclosed tile tray allows the user to place, organize, flip, and rotate tiles without disturbing other adjacent tiles or tiles in proximity to the tile being manipulated. In addition, the tile tray provides a stable support surface for tiles, allowing the tiles to support accessories such as markers, counters, overlapping tiles, or other objects.

Embodiments of the present invention relate to tile trays. In some embodiments, the present invention comprises a tile tray including at least one cell, the cell including a bottom, at least one side abutting the bottom, the at least one side extending upward from the bottom, a node extending upward from the bottom, and a channel between the node and the at least one side. In further embodiments, the at least one cell is a plurality of cells. In certain embodiments, the plurality of cells are arranged in an array wherein the at least one side of each cell in the array abuts the at least one side of another cell in the array. In some embodiments, the at least one side is three sides and the at least one cell is triangular in shape, the at least one side is four sides and the at least one cell is rectangular in shape, or the at least one side is six sides and the at least one cell is hexagonal in shape. In certain embodiments, the at least one cell is square in shape. In some embodiments, the node includes a top surface, and the top surface is substantially parallel to the bottom and substantially perpendicular to the at least one side. In certain embodiments, the node has a height measured from the bottom to the top surface, wherein the at least one side has a height measured from the bottom to a top of the at least one side, and wherein the height of the at least one side is greater than the height of the node. In further embodiments, the present invention includes at least one tile having a height and an equal number of sides as the at least one cell, and wherein the height of the tile added to the height of the node is substantially equal to the height of the at least one side. In other embodiments, the height of the tile added to the height of the node is greater than the height of the at least one side. In some embodiments, the top surface is circular. In certain embodiments, the node is a cylinder or a frustum. In some embodiments, the tile tray includes a connector for securing the tile tray to another tile tray.

In further embodiments, the present invention comprises a tile tray system including at least two tile trays, each tile tray including at least one cell including a bottom, at least one side abutting the bottom, a node extending upwards from the bottom and having a top surface substantially parallel to the bottom and substantially perpendicular to the at least one side, and a channel between the node and the at least one side, and at least one connector for securing one of the at least two tile trays to another of the at least two tile trays.

In certain embodiments, the present invention comprises a method of manipulating a tile, the method including providing a cell including a bottom, at least one side abutting the bottom, the at least one side extending upward from the bottom, a node extending upward from the bottom and having a top surface substantially parallel to the bottom, and a channel between the node and the at least one side, then providing a tile atop the top surface, then moving a first portion of the tile into the channel, thereby raising an opposite second portion of the tile, the node serving as a fulcrum for the tile. In some embodiments, the first portion of the tile is a corner of the tile and the second portion is the opposite corner of the tile. In other embodiments, the first portion of the tile is a side of the tile and the second portion is the opposite side of the tile. In certain embodiments, the first portion is one point on the periphery of the tile and the second portion is an opposite point on the periphery of the tile. In some embodiments, the method further includes moving the first portion substantially horizontally along the channel to rotate the tile. In some embodiments, the method further includes flipping the tile. In some embodiments, the method further includes removing the tile from the cell.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein is not necessarily intended to address every object described herein, and each embodiment does not necessarily include each feature described. Other forms, embodiments, objects, advantages, benefits, features, and aspects of the present invention will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

A better understanding of the present invention will be had upon reference to the following description in conjunction with the accompanying drawings.

FIG. 1A depicts a top perspective view of a first embodiment of a nine cell tile tray with a tile being lowered into the central cell in the direction indicated by the downward pointing arrows;

FIG. 1B depicts a top perspective view of the tile tray of FIG. 1A with the tile resting in the central cell;

FIG. 1C depicts a top perspective view of the tile tray of FIG. 1B with a corner of the tile indicated by a downward pointing arrow being pressed downward into a channel and an opposite corner being raised upward;

FIG. 1D depicts a top perspective view of the tile tray of FIG. 1C with the tile being rotated in a counter-clockwise direction as indicated by curved arrows, with the corner of the tile depressed against the node, the node serving as a fulcrum, while the channel guides the rotation of the tile;

FIG. 1E depicts a top perspective view of the tile tray of FIG. 1D with the downward pressure on the depressed corner of the tile being released, resulting in the opposite corner of the tile moving downward as indicated by the downward pointing arrow;

FIG. 1F depicts a top perspective view of the tile tray of FIG. 1D with the tile resting in the central cell at an orientation rotated 90 degrees from the orientation depicted in FIG. 1B;

FIG. 2A depicts a top perspective view of the first embodiment of a nine cell tile tray wherein a side of the tile indicated by a downward pointing arrow will be pressed downward into the channel;

FIG. 2B depicts a top perspective view of the tile tray of FIG. 2A with the side of the tile being pressed downward into the channel and the opposite side of the tile raising upward in the direction indicated by the curved arrows;

FIG. 2C depicts a top perspective view of the tile tray of FIG. 2B with the tile flipped to the opposite face and being lowered onto the central cell in the direction indicated by the downward pointing arrows;

FIG. 2D depicts a top perspective view of the tile tray of FIG. 2C with the tile resting in the central cell and displaying the opposite face;

FIG. 3A depicts a top perspective view of the first embodiment of a nine cell tile tray wherein a physical marker is being lowered in the direction of the downward pointing arrow onto a tile resting in the central cell;

FIG. 3B depicts a top perspective view of the tile tray of FIG. 3A with the physical marker being moved across the tile in the direction indicated by the arrow;

FIG. 3C depicts a top perspective view of the tile tray of FIG. 3B with the physical marker resting on the tile; and FIG. 3D depicts a top perspective view of the tile tray of FIG. 3C with multiple physical markers resting on multiple tiles.

DETAILED DESCRIPTION OF THE PREFERRED EMBODIMENTS

Figure 1A:
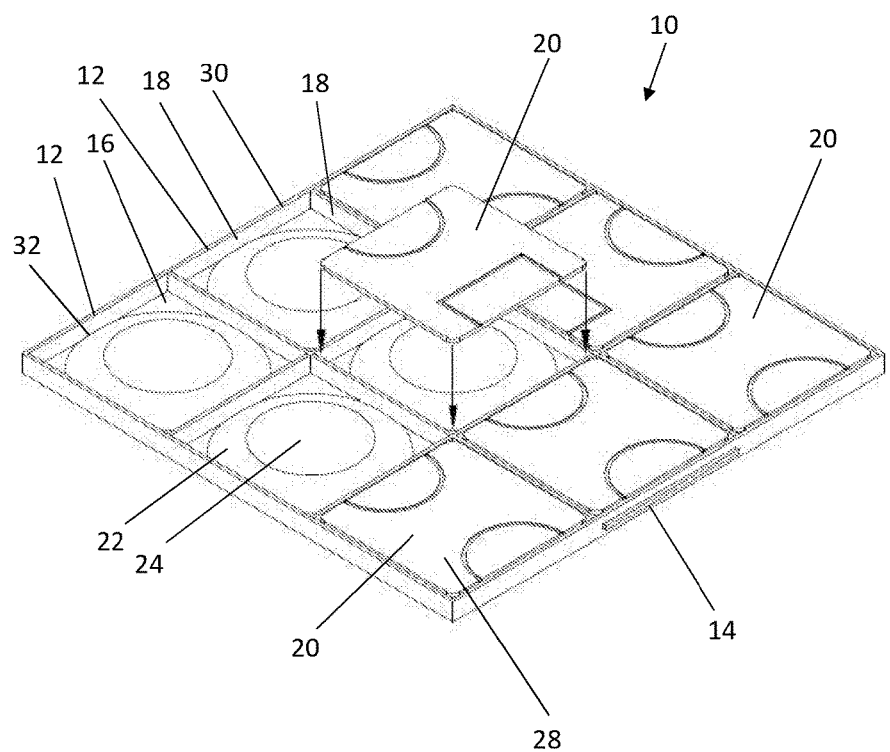
FIGS. 1A-1F depict an exemplary tile tray and a process of placing a tile onto the tile tray and rotating the tile.
Figure 1B:
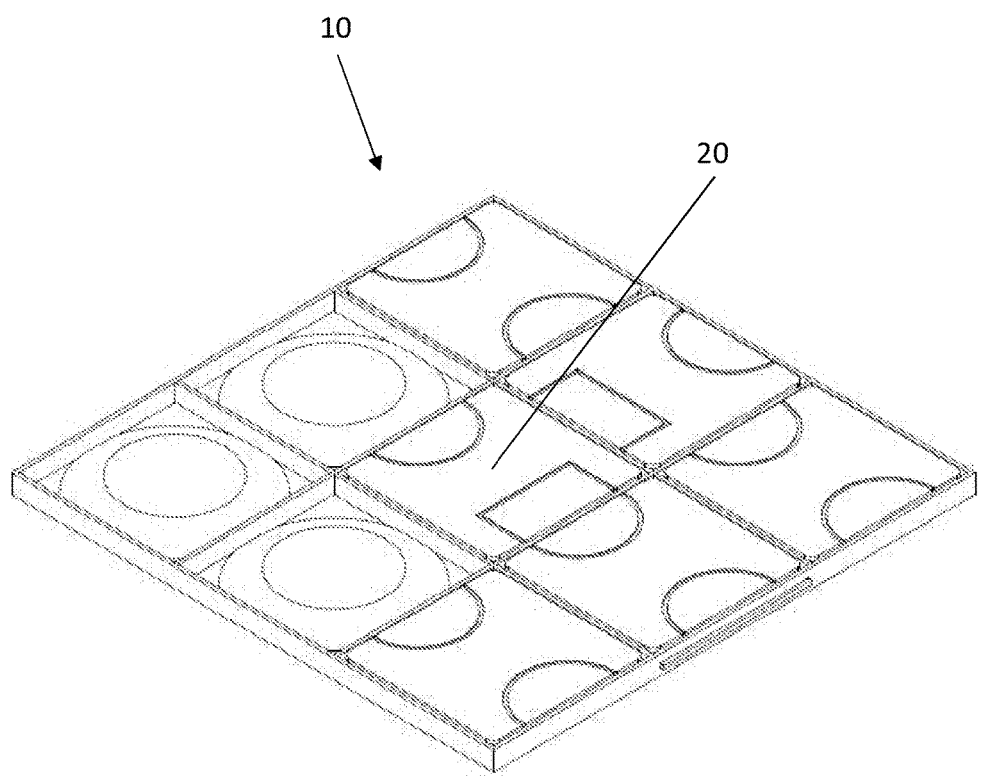

For the purposes of promoting an understanding of the principles of the invention, reference will now be made to selected embodiments illustrated in the drawings and specific language will be used to describe the same. It will nevertheless be understood that no limitation of the scope of the invention is thereby intended; any alterations and further modifications of the described or illustrated embodiments, and any further applications of the principles of the invention as illustrated herein are contemplated as would normally occur to one skilled in the art to which the invention relates. At least one embodiment of the invention is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to "advantages" provided by some embodiments of the present invention, other embodiments may not include those same advantages, or may include different advantages. Any advantages described herein are not to be construed as limiting to any of the claims.

Specific quantities (spatial dimensions, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

The word "tile," as used herein, refers to a thin object having two opposing faces typically constructed in a geometric shape. While the tiles depicted in the figures are square shaped, having four equal sides, it should be understood that tiles may be rectangular (four sides), triangular (three sides), elliptical (one side), hexagonal (six sides), or other geometric or non-geometric shapes. Tiles may be constructed of stiff paper, card stock, paperboard, plastic, wood, metal, ceramic, stone, glass, or other suitable materials known in the art. One or both of the faces of the tile may include information, such as text, artwork, or design, which may be individual to the tile and/or may be combined with information on other tiles. For example, individual tiles may each display a letter, whereby tiles may be arranged to form words. For another example, individual tiles may each display a portion of an image, whereby tiles may be arranged to form the complete image. For clarity in the illustration of movement, each of the tiles depicted herein include a half circle and/or a half square design on one face of the tile and no design on the opposite face of the tile.

Referring to FIGS. 1A-1F, 2A-2D and 3A-3D, a first embodiment of a tile tray 10 is shown having a nine cells 12 arranged in a square array of three columns of three cells each and three rows of three cells each. In other embodiments, the tile tray may include a single cell, a row or column of cells, or arrays of cells including additional or fewer rows or columns, or arrays arranged in rectangular or other non-square shapes.

In some embodiments, a tile tray 10 includes a connector 14 for securing the tile tray 10 to another tile tray 10. In this manner, multiple tile trays 10 may be assembled in a modular fashion to create larger tile trays. In the depicted embodiment, the connector 14 is a tongue and groove mechanism. In other embodiments, the connector(s) may be other mechanisms for securing objects together, such as snap fit mechanisms, magnets, clips, clasps, buttons, ties, or other mechanisms known in the art. In certain embodiments, individual tile trays 10 may be connected in a modular fashion to form larger trays, then later disconnected for ease of storage or transport.

In the depicted embodiment, each cell 12 includes a bottom 16 and four sides 18 abutting the bottom 16 and extending upward therefrom. In the depicted embodiment, individual cells 12 are square shaped. In other embodiments, cells have other shapes such as ellipses, wherein the cell includes a single curved side, triangles, wherein the cell includes three sides, quadrilaterals, wherein the cell includes four sides, hexagons, wherein the cell includes six sides, or other geometric or non-geometric shapes. In preferred embodiments, cells 12 and tiles 20 designed to be placed in the cells have the same number of sides and substantially the same shape. In the depicted embodiment, square tiles 20 are positioned within square cells 12. In other embodiments, hexagon-shaped tiles may be positioned within hexagon-shaped cells. In the depicted embodiment, the sides 18 of the cell 12 extend upward substantially perpendicular to the bottom 16. In other embodiments, the sides may slope outwards or slope inwards from the bottom.

Each cell 12 includes a node 22 extending upward from the bottom 16, the node 22 including a flat top surface 24 substantially parallel to the bottom 16. In the depicted embodiment, each node 22 is a frustum. In other embodiments, the nodes may be cylinders. In further embodiments, the nodes may be other geometric shapes with a substantially flat top surface. The top surface 24 of each node 22 serves as a support for a tile 20 placed atop the node 22. In some embodiments, the top surface 24 includes a surface area of sufficient size to stably support a tile 20 atop the top surface 24. In further embodiments, the top surface 24 includes a surface area of sufficient size to stably support a tile 20 atop the top surface 24 while an accessory item 26, such as a physical marker, is placed atop the tile at a corner or side of the tile. In another embodiment, the top surface 24 includes a surface area of sufficient size to stably support a tile 20 atop the top surface 24 while multiple accessories 26 are placed atop the tile 20. In certain embodiments, the height of the top surface 24 of the node 22, measured from the bottom 16 of the cell 12, is less than the height of the sides 18, measured from the bottom 16 of the cell 12. In further embodiments, the difference between the height of the sides 18 and the height of the top surface 24 is substantially equal to the height of a tile 20, such that the top face 28 of a tile resting upon the top surface 24 of the node 22 is at substantially the same elevation as the top 30 of the sides 18. In these embodiments, contact between the tile 20 and the sides 18 restricts the lateral movement of the tile 20 and retains the tile within the cell 12.

The cell sides 18 and node 22 are positioned in a spaced-apart relationship, forming a channel 32 between the node 22 and the sides 18. In certain embodiments, including the depicted first embodiment, the channel 32 extends around the entire circumference of the node 22. In other embodiments, the channel 32 may extend around a portion of the circumference of the node 22.

The cell sides 18, channel 32 and node 22 cooperatively serve as a guide for manipulating a tile 20 by directing movement of the tile 20 when force is applied to the tile 20 as described below.

Manipulation of a tile by adding a tile to the tile tray is depicted in FIG. 1A. A tile 20 may simply be lowered into a cell 12 by a user, the tile 20 resting upon and being supported by the top surface 24 of the node 22.

Figure 1C:
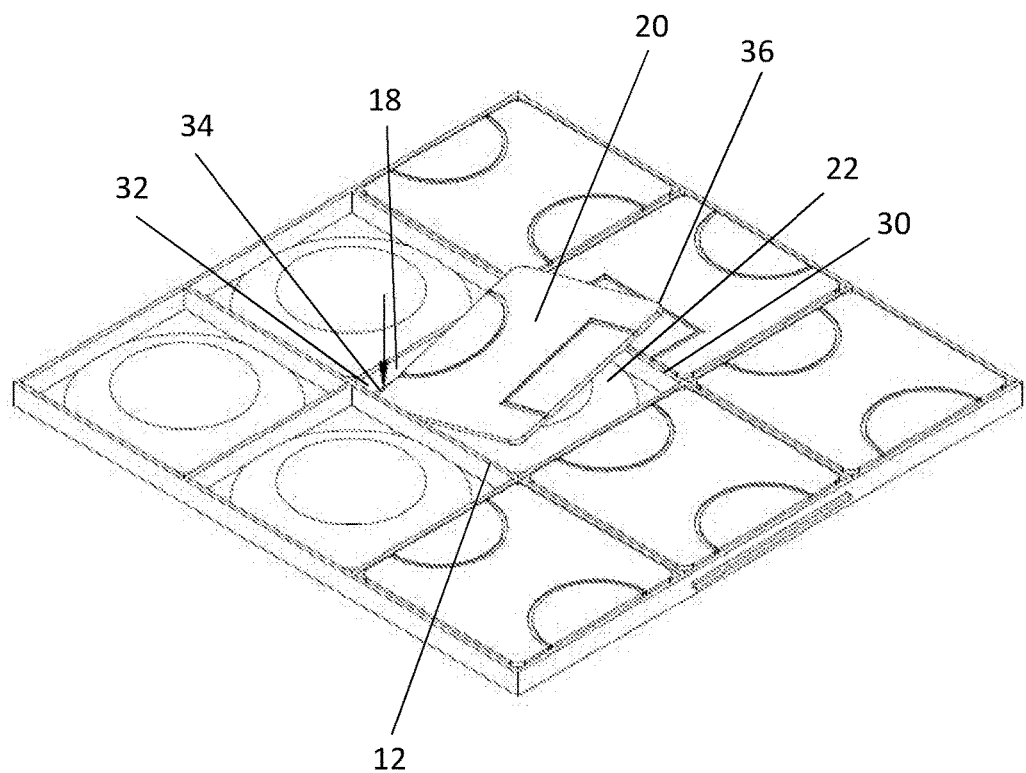
Figure 1D:
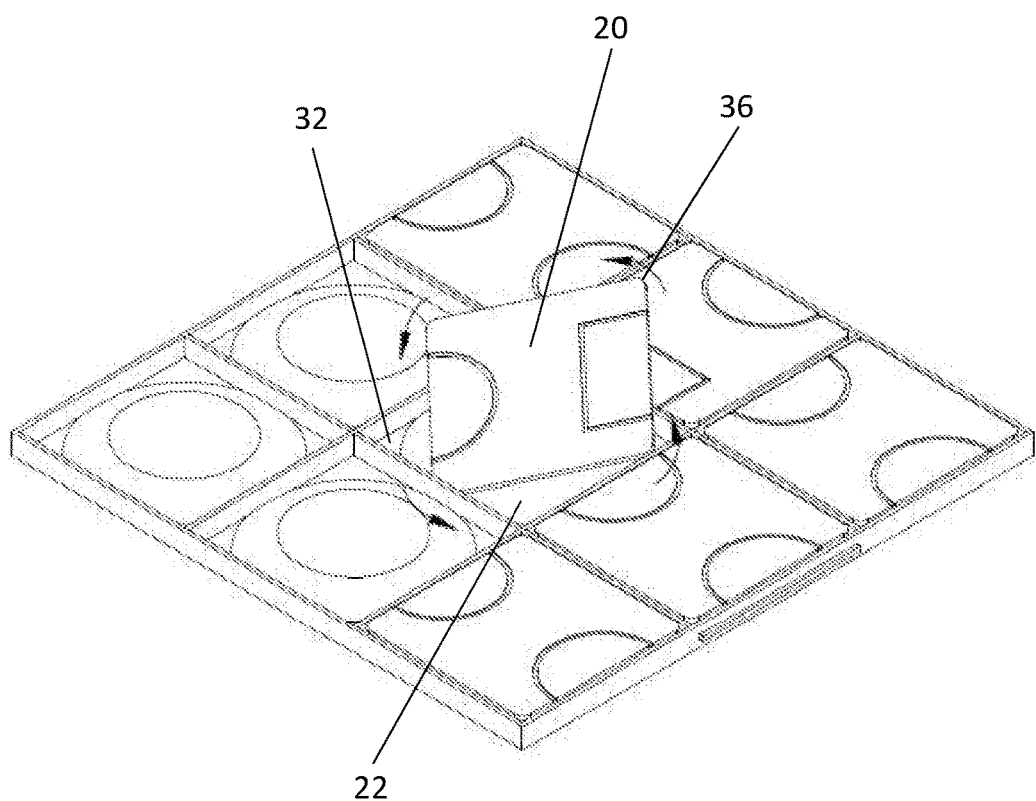
Figure 1E:
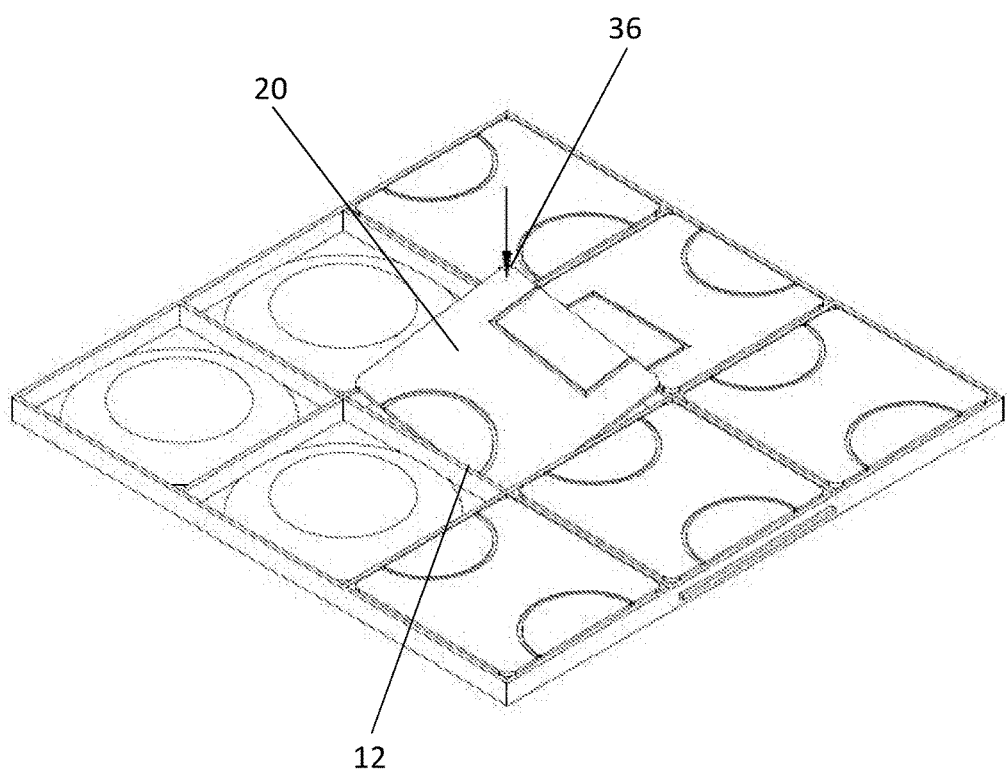
Figure 1F:
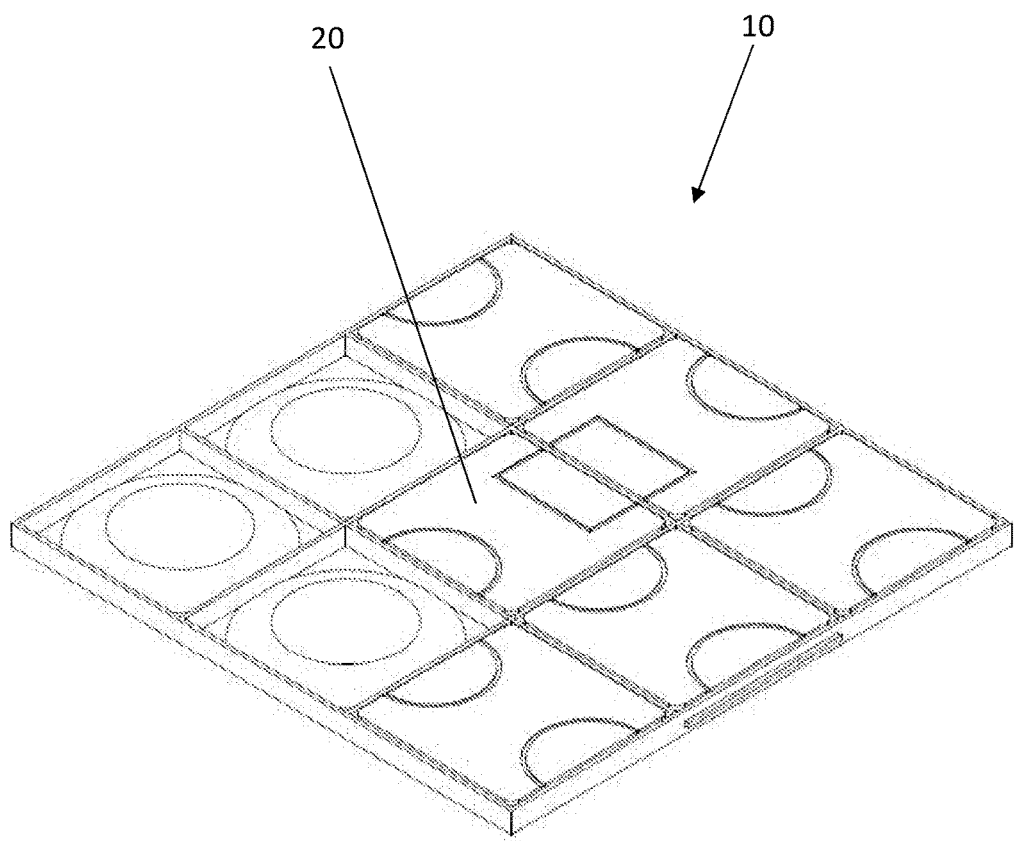

Manipulation of a tile by rotation is depicted in FIGS. 1B-1F. From a resting position (FIG. 1B), force is applied to one corner 34 of the tile, pushing the corner downward into the channel between the side 18 and node 22 (FIG. 1C). This action lifts the tile's opposite corner 36 up beyond the top 30 of the sides 18 of the cell 12, the node 22 serving as a fulcrum (FIG. 1C), allowing the tile's downward corner 34 to be moved along the channel 32, thereby rotating the tile 20 (FIG. 1D). The channel 32 limits the movement of the downward corner 34 of the tile 20 to a predetermined path about the node 22 and the opposite raised corner 36 of the tile 20 is raised above adjacent cells such that the rotating tile 20 will not contact tiles in adjacent cells during rotation (FIG. 1D). When the tile 20 has been rotated to a desired orientation, the downward force applied to the corner 34 of the tile 20 is removed, causing the opposite corner 36 of the tile 20 to descend (FIG. 1E), and the tile 20 returns to a resting position atop the top surface of the node (not visible) wherein the top face 28 of the tile is displayed in a rotated orientation (FIG. 1F).

Figure 2A:
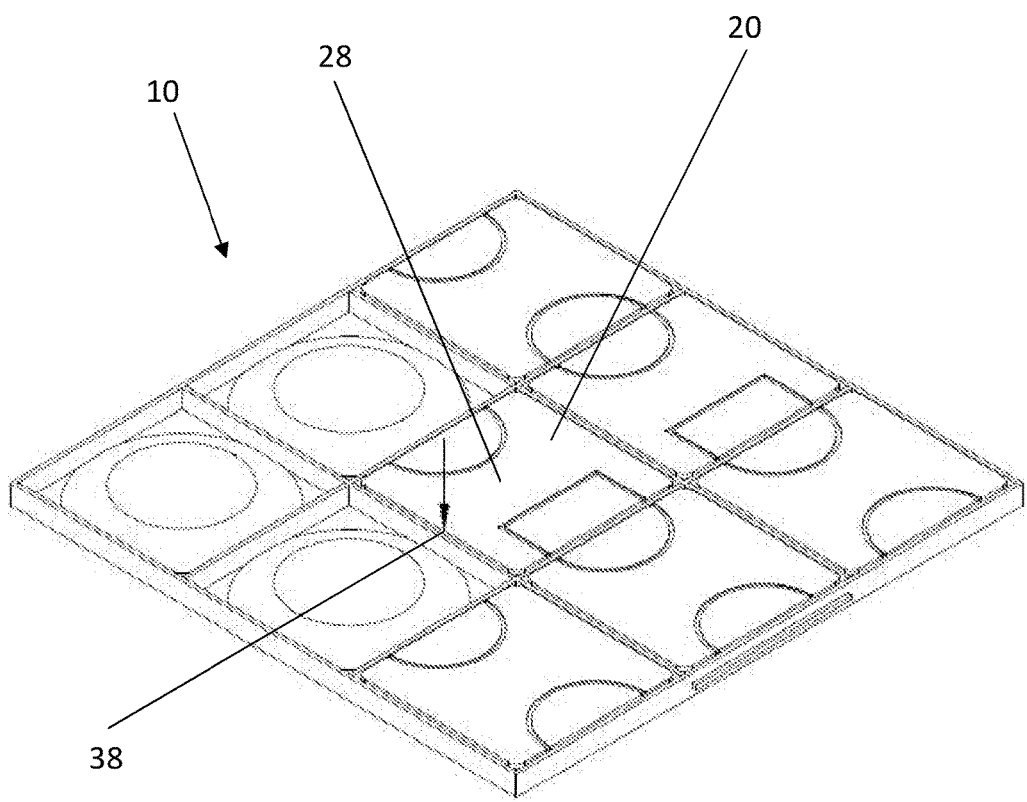
FIGS. 2A-2D depict the exemplary tile tray and a process for flipping a tile.
Figure 2B:
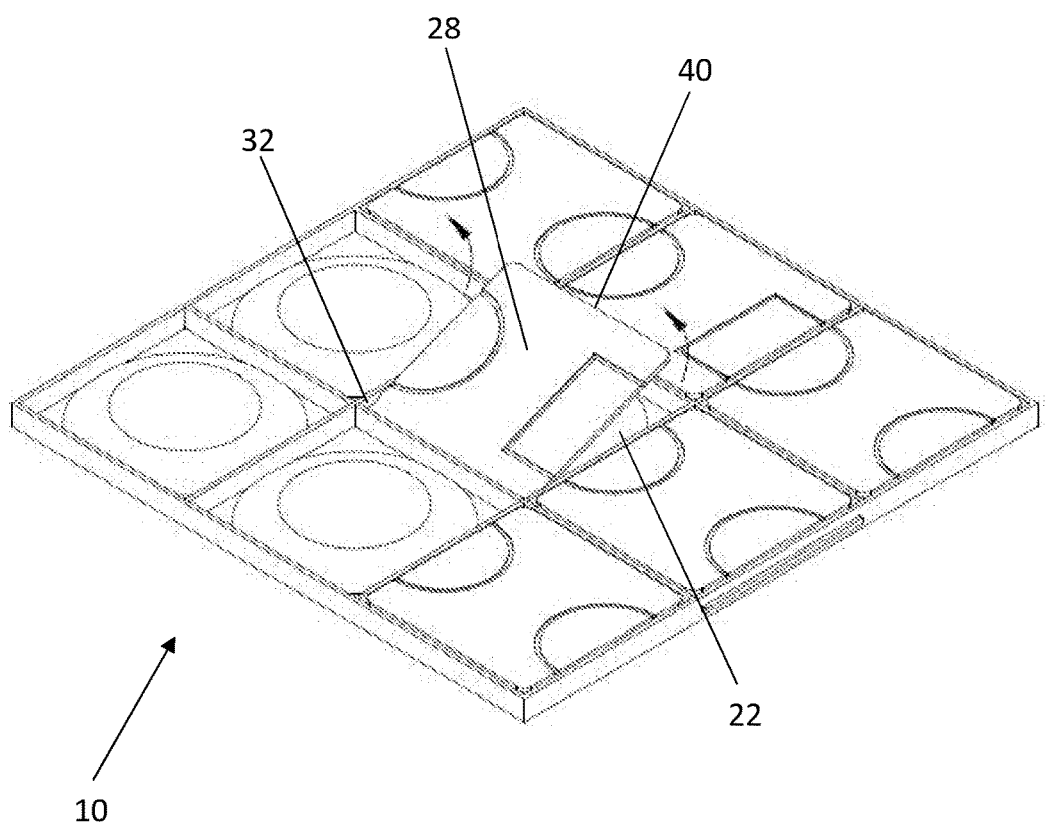
Figure 2C:
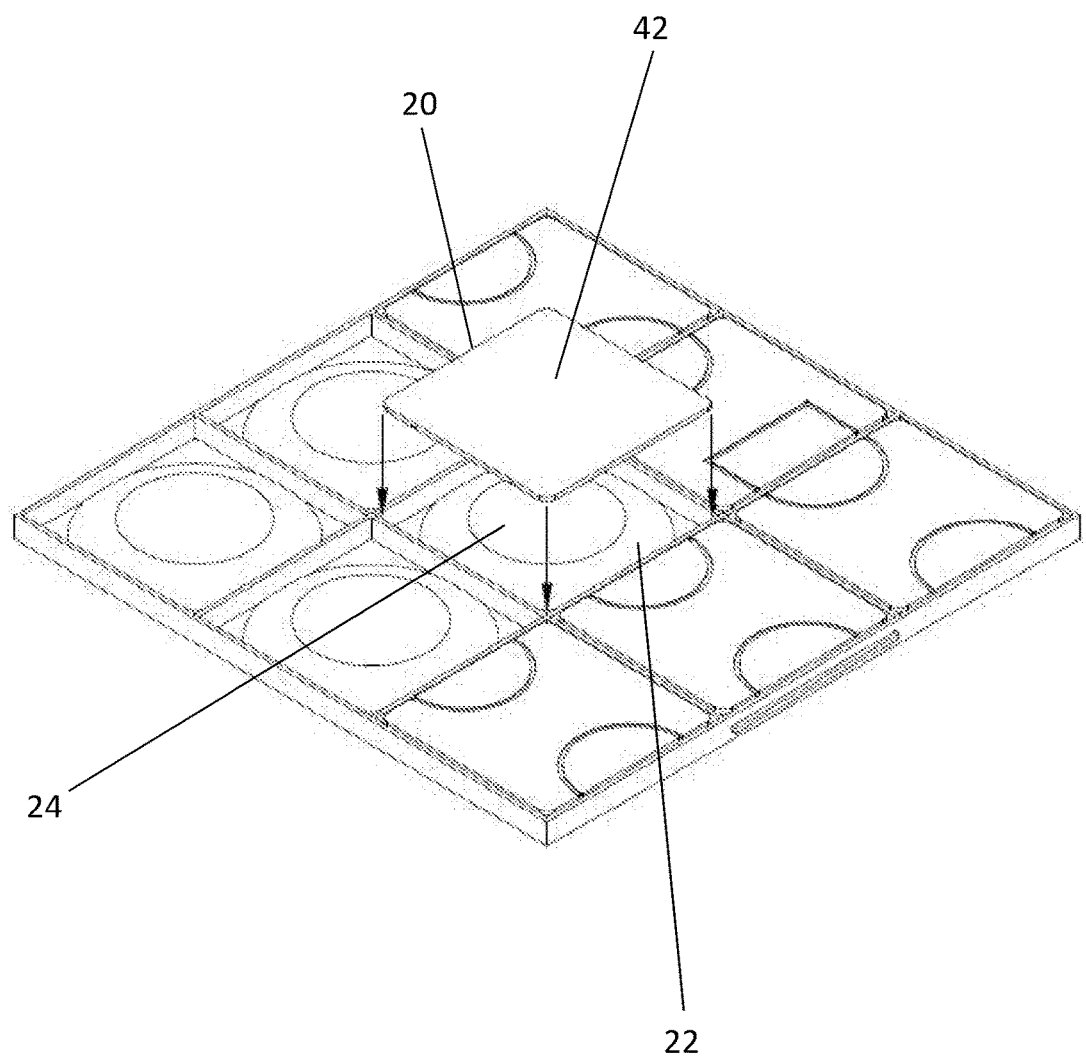
Figure 2D:
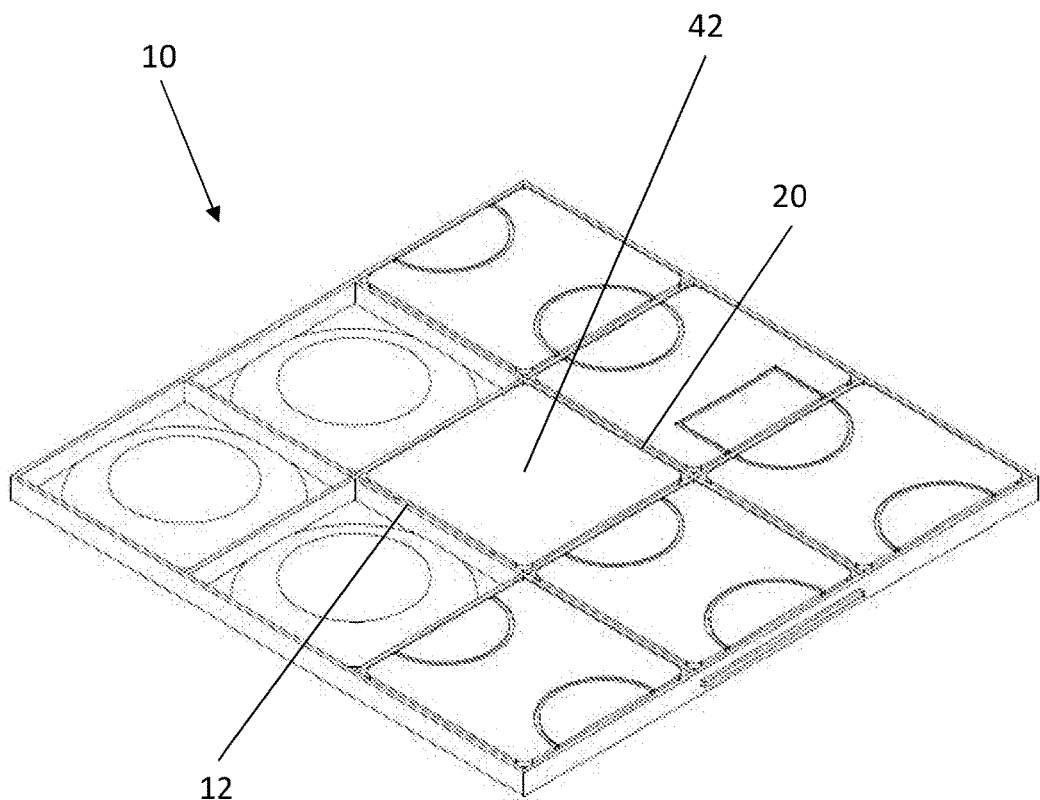

Manipulation of a tile by flipping is depicted in FIGS. 2A-2D. From a resting position, force is applied to one side 38 of the tile 20, pushing the side 38 downward (FIG. 2A). Pushing the side 38 downward into the channel 32 lifts the tile's opposite side 40 up beyond the sides 18 of the cell 12, the node 22 serving as a support fulcrum (FIG. 2B), such that the opposite side 40 of the tile 20 is available and easily grasped by a user. The channel 32 limits the movement of the downward side 38 of the tile 20 and the opposite raised side 40 of the tile 20 is raised above adjacent cells such that the tile 20 will not contact tiles in adjacent cells when being grasped by the user (FIG. 1D). The user may then flip the tile 20 to display its opposite face 40 and lower the tile 20 onto the top surface 24 of the node 22 (FIG. 2C), thereby returning the tile 20 to a resting position within the cell 12 displaying the opposite face 42 of the tile (FIG. 2D).

Manipulation of a tile by removing the tile begins similar to the flipping process. However, once the opposite side 40 of the tile 20 is lifted and made available to the user (FIG. 2B), the user simply grasps the tile 20 and removes it from the tile tray 10. Similarly, manipulation of a tile by moving the tile begins similar to the flipping process. However, once the opposite side 40 of the tile 20 is lifted and made available to the user (FIG. 2B), the user moves the tile 20 to another cell 12 and lowers the tile 20 into the other cell 12 as shown in FIG. 1A. Alternatively, manipulation of a tile by removing or moving the tile may begin similar to the rotation process. However, once the opposite corner 36 of the tile 20 is lifted and made available to the user (FIG. 1C), the user may simply grasp the tile 20 and remove the tile 20 from the tile tray 10 or move the tile 20 to another cell 12 in the tile tray 10.

Figure 3A:
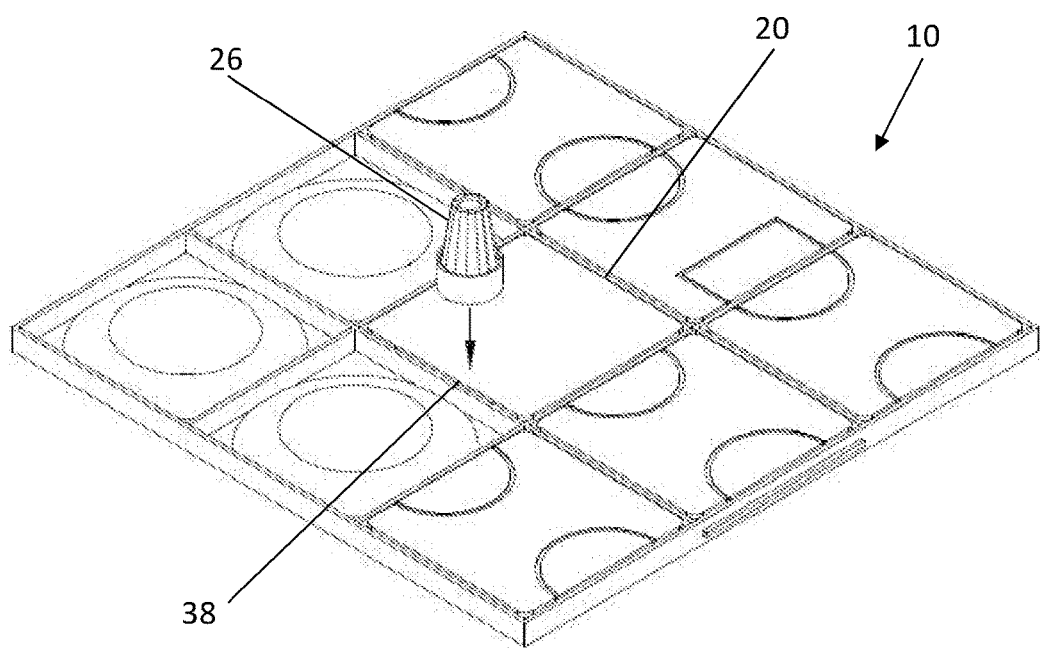
FIGS. 3A-D depict the exemplary tile tray with accessories positioned atop tiles.
Figure 3B:
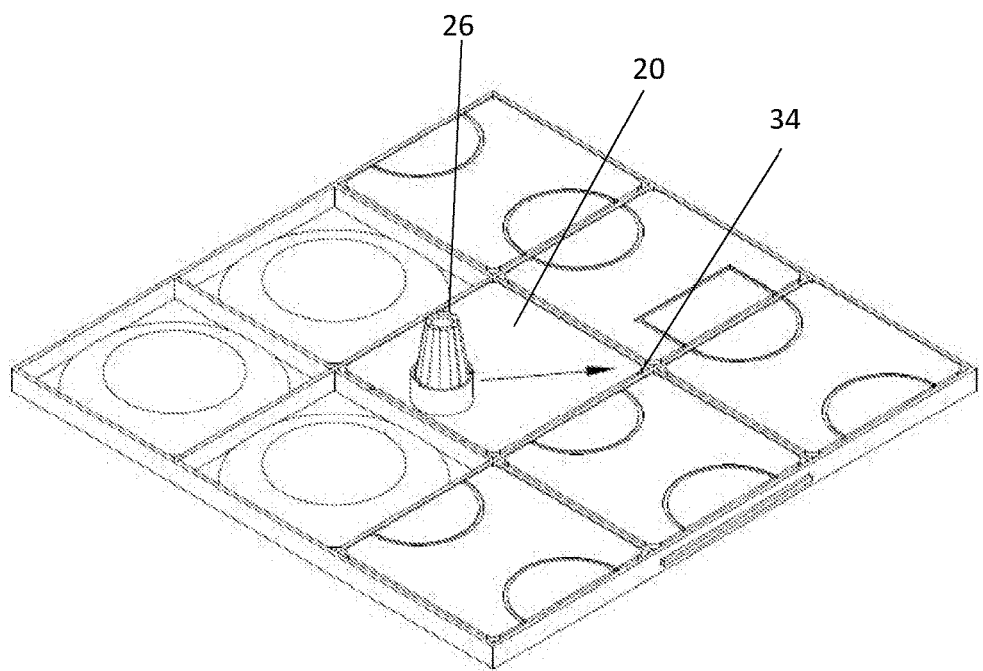
Figure 3C:
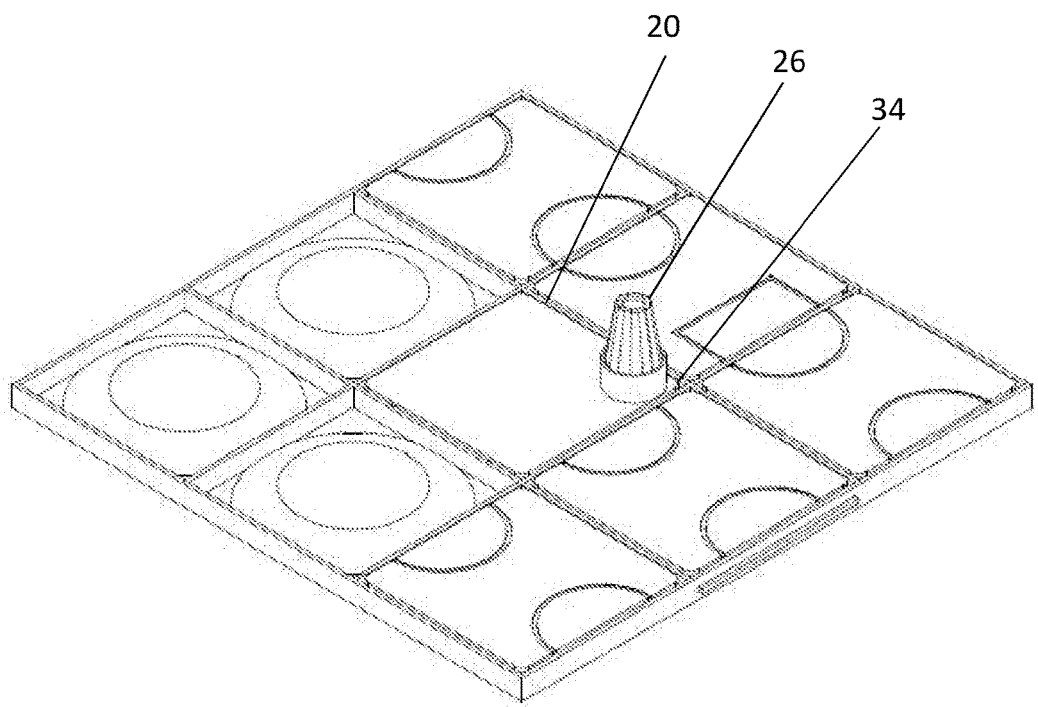
Figure 3D:
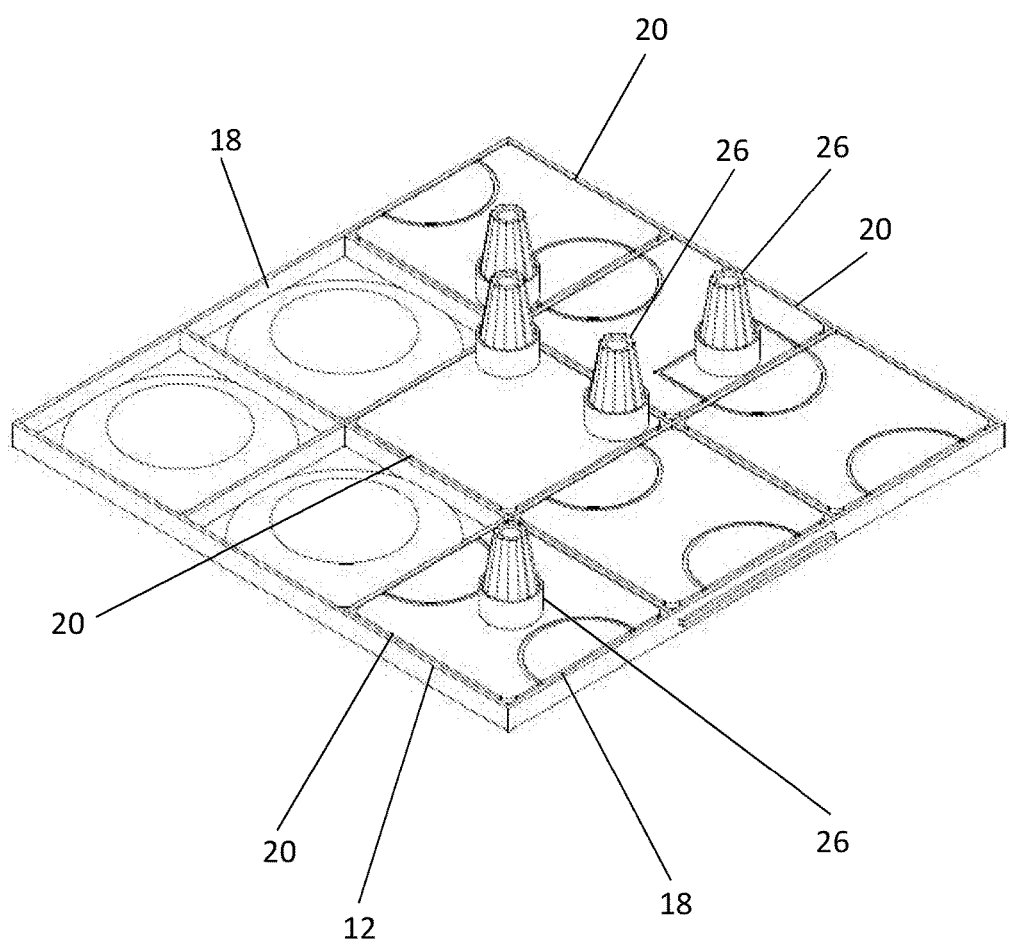

FIGS. 3A-3D illustrate use of the tile tray and tiles as supports for accessories. An accessory 26, in this case, a physical marker, is placed on a tile 20 near the side 38 of the tile 20 (FIG. 3A) and moved across the tile 20 (FIG. 3B) to a new position near the corner 34 of the tile 20 (FIG. 3C). FIG. 3D depicts five accessory pieces 26 placed at various locations on various tiles 20. Downward force provided by the weight of the accessories 26 does not shift, alter, move, or disturb the tiles 20 upon which the accessories 26 rest. Furthermore, contact between each tile 20 and the sides 18 of its respective cell 12 restricts lateral movement of the tile 20. This restriction prevents friction between a moving accessory 26 and the tile 20 from sliding into an adjacent tile, and retains the tile 20 within the cell 12.

The foregoing detailed description is given primarily for clearness of understanding and no unnecessary limitations are to be understood therefrom, for modifications can be made by those skilled in the art upon reading this disclosure and may be made without departing from the spirit of the invention. Although specific spatial dimensions are stated herein, such specific quantities are presented as examples only.

What is claimed is:

1. A tile tray comprising:
    at least one cell including
        a bottom,
        at least one side abutting the bottom, the at least one side extending upward from the bottom and having a height measured from the bottom to a top of the at least one side,
        a node extending upward from the bottom, the node including a top surface and having a height measured from the bottom to the top surface, and
        a channel between the node and the at least one side; and
    at least one tile having a height and an equal number of sides as the at least one cell;
    wherein the height of the at least one side is greater than the height of the node; and
    wherein the height of the tile added to the height of the node is substantially equal to the height of the at least one side.

2. The tile tray of claim 1, wherein the at least one cell is a plurality of cells.

3. The tile tray of claim 2, wherein the plurality of cells are arranged in an array wherein the at least one side of each cell in the array abuts the at least one side of another cell in the array.

4. The tile tray of claim 1, wherein the at least one side is four sides and the at least one cell is rectangular in shape.

5. The tile tray of claim 4, wherein the at least one cell is square in shape.

6. The tile tray of claim 1, wherein the top surface is substantially parallel to the bottom and substantially perpendicular to the at least one side.

7. The tile tray of claim 1, wherein the top surface is circular.

8. The tile tray of claim 7, wherein the node is a cylinder.

9. The tile tray of claim 7, wherein the node is a frustum.

10. The tile tray of claim 1, further comprising a connector for securing the tile tray to another tile tray.

11. A tile tray system comprising:
    at least two tile trays, each tile tray including
        at least one cell including
            a bottom,
            at least one side abutting the bottom, the at least one side extending upward from the bottom and having a height measured from the bottom to a top of the at least one side,
            a node extending upwards from the bottom and having a top surface substantially parallel to the bottom and substantially perpendicular to the at least one side, and having a height measured from the bottom to the top surface, and
            a channel between the node and the at least one side;
    at least one connector for securing one of the at least two tile trays to another of the at least two tile trays; and
    at least one tile having a height and an equal number of sides as the at least one cell;
    wherein the height of the at least one side is greater than the height of the node; and
    wherein the height of the tile added to the height of the node is substantially equal to the height of the at least one side.

12. A method of manipulating a tile, comprising:
    providing a cell including
        a bottom,
        at least one side abutting the bottom, the at least one side extending upward from the bottom,
        a node extending upward from the bottom and having a top surface substantially parallel to the bottom, and
        a channel between the node and the at least one side;
    providing a tile atop the top surface; and
    moving a first portion of the tile into the channel, thereby raising an opposite second portion of the tile, the node serving as a fulcrum for the tile.

13. The method of claim 12, further comprising moving the first portion substantially horizontally along the channel to rotate the tile.

14. The method of claim 12, further comprising flipping the tile.

15. The method of claim 12, further comprising removing the tile from the cell.

* * * * *